(12) United States Patent
Reyes, Jr. et al.

(10) Patent No.: US 10,453,578 B2
(45) Date of Patent: Oct. 22, 2019

(54) MANAGING NUCLEAR REACTOR SPENT FUEL RODS

(71) Applicant: NuScale Power, LLC, Corvallis, OR (US)

(72) Inventors: Jose N. Reyes, Jr., Corvallis, OR (US); Christopher Colbert, Corvallis, OR (US)

(73) Assignee: NUSCALE POWER, LLC, Portland, OR (US)

( * ) Notice: Subject to any disclaimer, the term of this patent is extended or adjusted under 35 U.S.C. 154(b) by 194 days.

(21) Appl. No.: 15/083,543

(22) Filed: Mar. 29, 2016

(65) Prior Publication Data
US 2016/0232998 A1 Aug. 11, 2016

Related U.S. Application Data

(62) Division of application No. 13/786,643, filed on Mar. 6, 2013, now Pat. No. 9,406,409.

(51) Int. Cl.
| | |
|---|---|
| *G21F 5/012* | (2006.01) |
| *G21F 5/008* | (2006.01) |
| *G21C 19/07* | (2006.01) |
| *G21C 19/08* | (2006.01) |
| *G21F 5/10* | (2006.01) |

(Continued)

(52) U.S. Cl.
CPC ............ *G21F 5/012* (2013.01); *G21C 19/07* (2013.01); *G21C 19/08* (2013.01); *G21C 19/40* (2013.01); *G21F 5/008* (2013.01); *G21F 5/10* (2013.01); *G21C 19/32* (2013.01)

(58) Field of Classification Search
CPC . G21F 5/008; G21F 5/012; G21F 5/10; G21C 19/07; G21C 19/08; G21C 19/40; G21C 19/32
USPC ................... 376/261, 272; 250/506.1, 507.1
See application file for complete search history.

(56) References Cited

U.S. PATENT DOCUMENTS

| | | | |
|---|---|---|---|
| 3,073,961 A | * | 1/1963 | Nachbar ................... G21F 5/10 376/272 |
| 3,230,373 A | | 1/1966 | Montgomery |
| 3,650,029 A | | 3/1972 | Trelc |

(Continued)

FOREIGN PATENT DOCUMENTS

| | | |
|---|---|---|
| CN | 101562057 | 10/2009 |
| CN | 101916602 | 12/2010 |

(Continued)

OTHER PUBLICATIONS

Calik, "A comparison of radiation shielding of stainless steel with different magnetic properties", Nuclear Technology and Radiation Protection, 29.3 (2014): 186-189. (Year: 2014).*

(Continued)

*Primary Examiner* — Jack W Keith
*Assistant Examiner* — Daniel Wasil
(74) *Attorney, Agent, or Firm* — Schwabe Williamson & Wyatt

(57) ABSTRACT

A spent nuclear fuel rod canister includes a submersible pressure vessel including a casing that defines an interior cavity, the casing including a corrosion resistant and heat conductive material and a rack enclosed within the interior cavity and configured to support one or more spent nuclear fuel rods. The spent nuclear fuel rod canister includes a heat exchanger attached to the casing of the pressure vessel.

20 Claims, 14 Drawing Sheets

(51) Int. Cl.
*G21C 19/40* (2006.01)
*G21C 19/32* (2006.01)

(56) References Cited

U.S. PATENT DOCUMENTS

| | | | |
|---|---|---|---|
| 3,780,306 A | 12/1973 | Anderson et al. | |
| 4,088,897 A * | 5/1978 | Soot | G21C 19/07 376/272 |
| 4,491,540 A | 1/1985 | Larker et al. | |
| 4,535,642 A | 4/1985 | Ohmura | |
| 4,638,166 A * | 1/1987 | Baudro | G21F 3/04 376/287 |
| 5,028,217 A | 7/1991 | Miller | |
| 5,274,682 A | 12/1993 | McDonalds | |
| 5,759,093 A | 6/1998 | Rodriguez | |
| 5,797,189 A | 8/1998 | Gilbert | |
| 5,860,218 A | 1/1999 | Vinciguerra | |
| 5,867,912 A | 2/1999 | Hickok et al. | |
| 6,785,355 B2 | 8/2004 | Georgii | |
| 7,668,281 B2 | 2/2010 | Balog et al. | |
| 8,718,221 B2 | 5/2014 | Singh et al. | |
| 8,905,259 B2 | 12/2014 | Singh et al. | |
| 2008/0069291 A1 * | 3/2008 | Singh | G21F 5/012 376/272 |
| 2008/0137794 A1 * | 6/2008 | Tjersland | G21C 19/04 376/272 |
| 2008/0265182 A1 | 10/2008 | Singh et al. | |
| 2008/0314172 A1 | 12/2008 | Maffeis | |
| 2009/0100948 A1 | 4/2009 | Ushiku et al. | |
| 2009/0129530 A1 | 5/2009 | Reyes et al. | |
| 2009/0129531 A1 | 5/2009 | Reyes et al. | |
| 2009/0129532 A1 | 5/2009 | Reyes et al. | |
| 2009/0161812 A1 | 6/2009 | Reyes et al. | |
| 2009/0326540 A1 | 12/2009 | Estes | |
| 2010/0090134 A1 | 4/2010 | Grinder et al. | |
| 2010/0124303 A1 | 5/2010 | Young et al. | |
| 2011/0122985 A1 * | 5/2011 | Tamaki | G21F 5/012 376/272 |
| 2011/0172484 A1 | 7/2011 | Singh et al. | |
| 2012/0041443 A1 | 2/2012 | Landon | |
| 2012/0177168 A1 | 7/2012 | Reyes et al. | |
| 2012/0187315 A1 | 7/2012 | Kibata et al. | |
| 2012/0294408 A1 | 11/2012 | Reyes et al. | |
| 2012/0328068 A1 | 12/2012 | Filippone | |
| 2013/0092684 A1 | 4/2013 | Roger | |
| 2014/0039235 A1 * | 2/2014 | Subiry | G21F 5/012 250/507.1 |
| 2014/0192946 A1 * | 7/2014 | Singh | G21F 5/008 376/272 |

FOREIGN PATENT DOCUMENTS

| | | |
|---|---|---|
| CN | 102142288 | 8/2011 |
| CN | 102568622 | 7/2012 |
| CN | 202650563 | 1/2013 |
| DE | 2008406 | 2/1972 |
| DE | 3903546 | 10/1989 |
| EP | 2353367 | 8/2011 |
| GB | 909692 * | 10/1962 |
| GB | 2267548 | 12/1993 |
| JP | S37011749 | 8/1962 |
| JP | 49113082 U | 9/1974 |
| JP | S63250590 | 10/1988 |
| JP | H02240596 | 9/1990 |
| JP | 2004509327 | 3/2004 |
| JP | 2004239408 | 8/2004 |
| JP | 2008292251 | 12/2008 |
| WO | WO2012047438 | 4/2012 |
| WO | 2014189582 | 11/2014 |

OTHER PUBLICATIONS

M. Jonathan Haire et al., "Extended Abstract—A Collaboration to Develop the Next-Generation SNF/HLW Cask," Proceedings of the 2003 International High-Level Radioactive Waste Management Conference, Mar. 30-Apr. 2, 2003, Las Vegas, Nevada, 8 pages.

Les Dole, Depleted Uranium as Aggregate in Concrete Shielding Material, Proceedings of the Russian-American Workshop on Management of Depleted Uranium, Dec. 9-10, 2002, Moscow, Russia, 41 pages.

Authorized Officer Hye Lyim Park, Notification of Transmittal of the International Search Report and the Written Opinion for International Application No. PCT/US2014/019072, dated Dec. 9, 2014, 11 pages.

Bruemmer et al., "PNNL-22290 Assessment of Materials Issues for Light-Water Small Modular Reactors", Feb. 2013, XP055421224, Retrieved from the Internet: URL:http://www.pnnl.gov/main/publications/external/technical_reports/pnnl-22290.pdf.

European extended Search Report in European Application No. 14801059, dated Feb. 9, 2017, 9 pages.

International Preliminary Report on Patentability in International Application No. PCT/US2014/019072, dated Sep. 17, 2015, 8 pages.

Reyes, "Passively Cooled Spent Fuel Pool Canister for Recently Discharged Nuclear Fuel," Aug. 7, 2012, 11 pages.

* cited by examiner

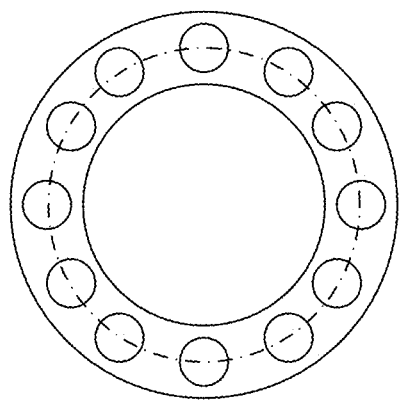
218
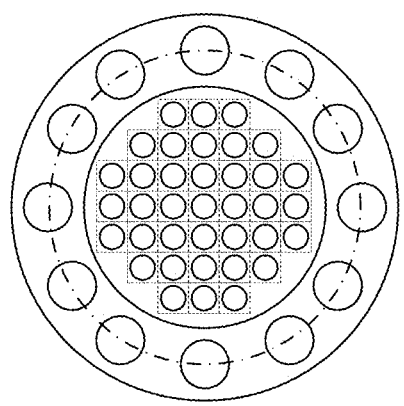
214
FIG. 2B

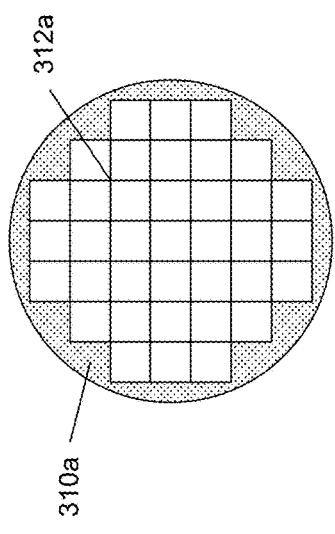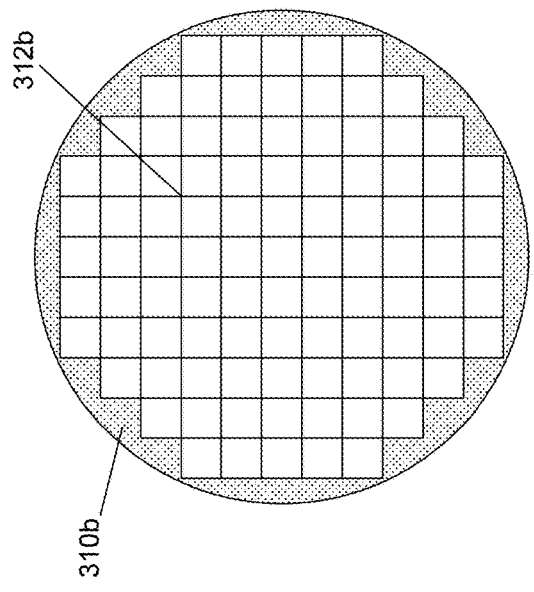

MANAGING NUCLEAR REACTOR SPENT FUEL RODS

PRIORITY CLAIM

This application is a divisional of U.S. application Ser. No. 13/786,643, filed Mar. 6, 2013, the contents of which are incorporated herewith.

TECHNICAL FIELD

This disclosure generally relates to systems and methods for storing and managing nuclear spent fuel.

BACKGROUND

Spent fuel pools provide long term decay heat removal from fuel that has been recently discharged from a nuclear reactor. A recently discharged nuclear core typically represents the largest source of heat generation in a spent fuel pool. In the event of a complete loss of power to the nuclear power plant, cooling systems for the spent fuel pool may not be available to remove the fuel's decay heat. For prolonged nuclear plant station blackout conditions with recently discharged fuel, the potential exists to boil off all of the water in the spent fuel pool thereby overheating and subsequently damaging the spent fuel bundles. This may result in a radioactive release to the environment.

SUMMARY

This disclosure describes technologies related to systems, apparatus, and methods for handling, storing, and otherwise managing spent fuel rods from a nuclear reactor. In one general implementation, a spent nuclear fuel rod canister includes a submersible pressure vessel including a casing that defines an interior cavity, the casing including a corrosion resistant and heat conductive material with a thermal conductivity of above about 7.0 watts per meter per kelvin; and a rack enclosed within the interior cavity and configured to support one or more spent nuclear fuel rods.

A first aspect combinable with the general implementation further includes a first hemispherical enclosure coupled to the casing at a top end of the casing.

In a second aspect combinable with any of the previous aspects, the first hemispherical enclosure includes a radiussed interior surface that defines a top portion of the interior cavity.

A third aspect combinable with any of the previous aspects further includes a second hemispherical enclosure coupled to the casing at a bottom end of the casing.

In a fourth aspect combinable with any of the previous aspects, the second hemispherical enclosure includes a radiussed interior surface that defines a bottom portion of the interior cavity.

A fifth aspect combinable with any of the previous aspects further includes a riser that defines a fluid pathway through the riser between a top portion of the interior cavity and a bottom portion of the interior cavity.

A sixth aspect combinable with any of the previous aspects further includes an annulus defined between the riser and the casing.

A seventh aspect combinable with any of the previous aspects further includes a fuel basket positioned in the interior cavity between the riser and the bottom portion of the interior cavity.

In an eighth aspect combinable with any of the previous aspects, the fuel basket includes a spent nuclear fuel rod rack.

In a ninth aspect combinable with any of the previous aspects, the fuel basket includes a perforated support plate adjacent a bottom surface of the rack, the fluid pathway fluidly coupled to the bottom portion of the interior cavity through the perforated support plate.

A tenth aspect combinable with any of the previous aspects further includes a heat exchanger attached to the casing of the pressure vessel.

In an eleventh aspect combinable with any of the previous aspects, the heat exchanger includes at least one conduit that is at least partially disposed exterior to the casing and is in fluid communication with the interior cavity.

In a twelfth aspect combinable with any of the previous aspects, the corrosion resistant material includes a high radioactivity conduction material.

In a thirteenth aspect combinable with any of the previous aspects, the vessel is free of any radiation shielding material.

In another general implementation, a spent nuclear fuel rod management system includes a spent fuel pool containing a heat transfer liquid; and a plurality of spent fuel canisters, where each of the canisters includes a submersible pressure vessel including a casing defining an interior cavity at least partially filled with a liquid coolant; a rack enclosed within the interior cavity; and one or more spent nuclear fuel rods supported in the rack.

In a first aspect combinable with the general implementation, the liquid coolant includes water.

In a second aspect combinable with any of the previous aspects, the heat transfer fluid includes at least one of water or ambient air.

In a third aspect combinable with any of the previous aspects, the heat removal rate of each canister is between about 0.3 MW and 0.8 MW.

In another general implementation, a method of dissipating decay heat generated by a spent nuclear fuel rod includes loading at least one spent nuclear fuel rod in a spent fuel canister that includes an inner cavity, the interior cavity at least partially filled with a fluid coolant; submerging the spent fuel canister in a heat transfer fluid contained in a spent fuel pool; transferring decay heat from the spent nuclear fuel rod to the fluid coolant; and transferring the decay heat from the fluid coolant to the heat transfer fluid in the spent fuel pool.

In a first aspect combinable with the general implementation, a rate at which heat is transferred from the spent fuel rod is at Past as great as a rate at which the spent nuclear fuel rod produces decay heat.

A second aspect combinable with any of the previous aspects further includes circulating the fluid coolant within the interior cavity of the spent fuel canister via natural circulation.

A third aspect combinable with any of the previous aspects further includes exposing an exterior surface of the spent fuel the canister to ambient air.

A fourth aspect combinable with any of the previous aspects further includes based on the exposure to ambient air, phase changing a portion of the fluid coolant from a liquid to a gas in the spent fuel canister; and phase changing the gas hack to a liquid condensate on an interior surface of the spent fuel canister based at least in part on heat transfer between the gas and the ambient air.

A fifth aspect combinable with any of the previous aspects further includes circulating at least a portion of the liquid condensate on the interior surface to a pool of the fluid coolant in a bottom portion of the canister.

In another general implementation, a method of managing spent fuel rods includes removing a first batch of spent fuel rods from a nuclear reactor; at a first time, installing the first batch of spent fuel rods in a spent fuel canister, the first batch of spent fuel rods generating decay heat at a first decay heat rate; submerging the spent fuel canister in a heat transfer fluid to remove decay heat from the first batch of spent fuel rods; removing decay heat from the first batch of spent fuel rods using the spent fuel canister for a time period at a rate greater than the first decay heat rate; at a second time subsequent to the first time, installing a second batch of spent fuel rods in the spent fuel canister, the second batch of spent fuel rods generating decay heat at a second decay heat rate greater than the first decay heat rate; and removing decay heat from the first and second batch of spent fuel rods at a rate at least as great as a sum of the first and second decay heat rates.

In a first aspect combinable with the general implementation, installing the first batch of spent fuel rods in a spent fuel canister includes installing the first batch of spent fuel rods in a spent fuel canister directly from the nuclear reactor.

A second aspect combinable with any of the previous aspects further includes removing at least a portion of the first batch of spent fuel rods; and installing the portion in a dry cask.

Various implementations described in this disclosure may include none, one, some, or all of the following features. For example, decay heat removal from spent nuclear fuel may be achieved through a canister into a pool rather than directly to a pool, thereby increasing an ease of handling of spent nuclear fuel and providing an additional safety barrier to fission product release. Further, in the case of loss of pool liquid or loss of recirculation of pool liquid (e.g., water), such as, due to a loss of power incident, decay heat removal from spent nuclear fuel may be achieved through the canister to ambient air. The decay heat removal rate may be substantially similar or identical to that achieved to the pool during normal operating conditions. In some implementations, a desired decay heat removal may be achieved without any operator action or power needed.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 2A-2C illustrate schematic views of an example implementation of a spent fuel canister operating in normal conditions having one stack or two stacks of spent fuel rods.

FIGS. 3A-3B illustrate schematic views of example racks for holding spent fuel rods.

DETAILED DESCRIPTION

Figure 1:
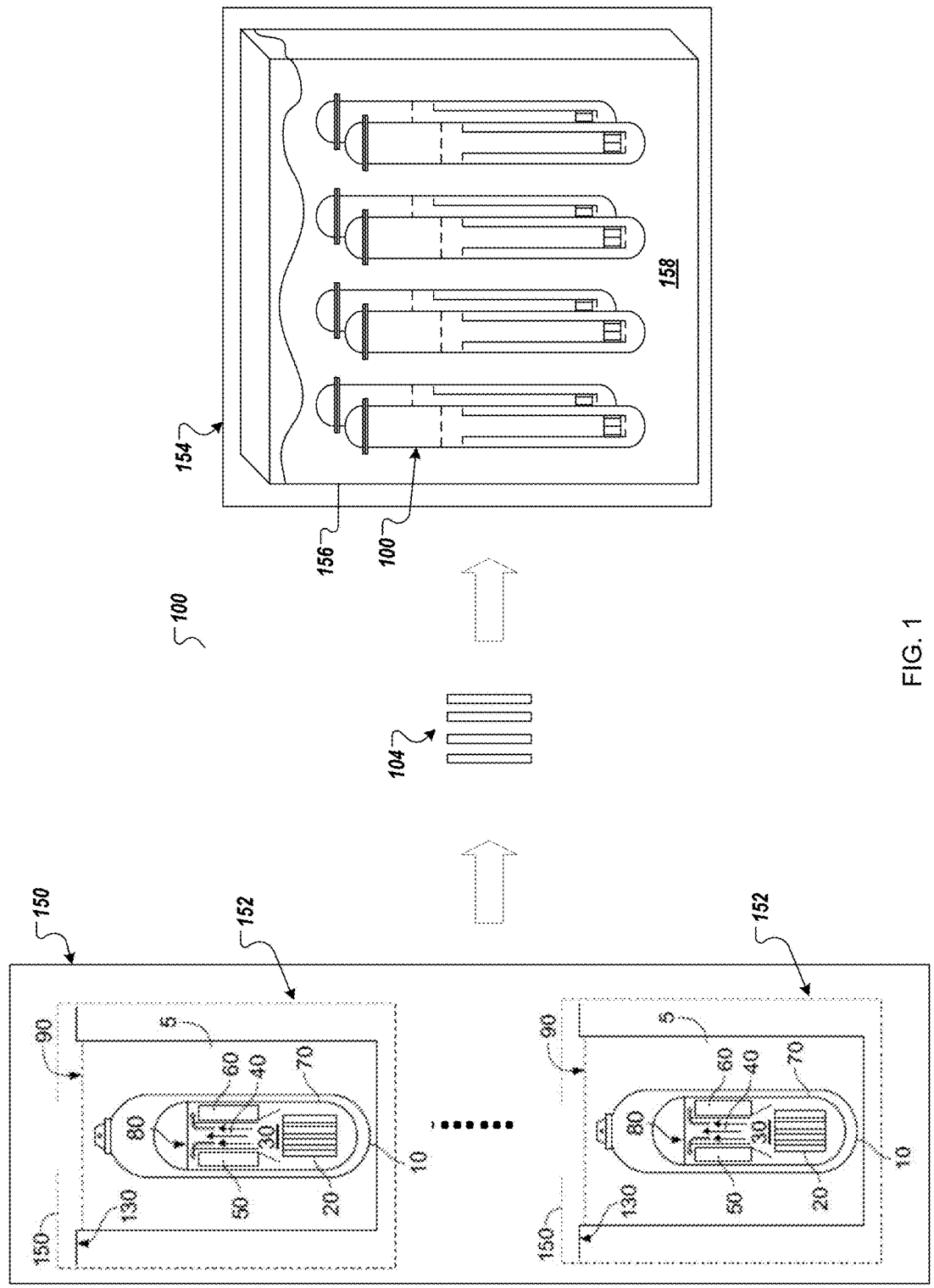
FIG. 1 is a block diagram illustrating a system of spent fuel management for a nuclear reactor systems.

FIG. 1 is a block diagram illustrating a technique of managing spent fuel 104 from one or more nuclear reactors 152 in a nuclear reactor power system 150. The technique involves removing spent nuclear fuel rods 104 from nuclear reactors 152 and transferring the spent fuel rods 104 to a spent fuel management system 154 that facilitates removal of residual decay heat produced by the spent fuel rods 104. Spent fuel management system 154 includes multiple spent fuel canisters 100 submerged in a spent fuel pool 156 filled with fluid 158. Fluid 158 provides a heat sink for receiving and dissipating the decay heat from spent fuel rods 104. As described in detail below, canisters 100 can be configured to operate passively, e.g., without operator intervention or supervision, under both normal and abnormal emergency conditions. In some examples, canisters 100 provide a long term decay heat removal solution for spent fuel rods 104. For example, canisters 100 can be capable of achieving a substantially constant heat removal rate (e.g., a heat removal rate of about 0.3 MW, 0.4 MW, or 0.8 MW) in various normal and abnormal operating conditions. The number of nuclear reactors 152 and canisters 100 in FIG. 1 are not indicative of any particular implementation or implementation, and are depicted for illustrative purposes only.

With respect to nuclear reactors 152, a reactor core 20 is positioned at a bottom portion of a cylinder-shaped or capsule-shaped reactor vessel 70. Reactor core 20 includes a quantity of nuclear fuel rods (e.g., fissile material that produces a controlled nuclear reaction) and optionally one or more control rods (not shown). In some implementations, nuclear reactors 152 are designed with passive operating systems employing the laws of physics to ensure that safe operation of the nuclear reactor 152 is maintained during normal operation or even in an emergency condition without operator intervention or supervision, at least for some predefined period of time. A cylinder-shaped or capsule-shaped containment vessel 10 surrounds reactor vessel 70 and is partially or completely submerged in a reactor pool, such as below waterline 90, within reactor bay 5. The volume between reactor vessel 70 and containment vessel 10 may be partially or completely evacuated to reduce heat transfer from reactor vessel 70 to the reactor pool. However, in other implementations, the volume between reactor vessel 70 and containment vessel 10 may be at least partially filled with a gas and/or a liquid that increases heat transfer between the reactor and containment vessels.

In a particular implementation, reactor core 20 is submerged within a liquid, such as water, which may include boron or other additives, which rises into channel 30 after making contact with a surface of the reactor core. The upward motion of heated coolant is represented by arrows 40 within channel 30. The coolant travels over the top of heat exchangers 50 and 60 and is drawn downward by density difference along the inner walls of reactor vessel 70 thus allowing the coolant to impart heat to heat exchangers 50 and 60. After reaching a bottom portion of the reactor vessel, contact with reactor core 20 results in heating the coolant, which again rises through channel 30.

Although heat exchangers 50 and 60 are shown as two distinct elements in FIG. 1, heat exchangers 50 and 60 may represent any number of helical coils that wrap around at least a portion of channel 30.

Normal operation of the nuclear reactor module proceeds in a manner wherein heated coolant rises through channel 30 and makes contact with heat exchangers 50 and 60. After contacting heat exchangers 50 and 60, the coolant sinks towards the bottom of reactor vessel 110 in a manner that induces a thermal siphoning process. In the example of FIG. 1, coolant within reactor vessel 70 remains at a pressure above atmospheric pressure, thus allowing the coolant to maintain a high temperature without vaporizing (e.g., boiling).

As coolant within heat exchangers 50 and 60 increases in temperature, the coolant may begin to boil. As the coolant within heat exchangers 50 and 60 begins to boil, vaporized coolant, such as steam, may be used to drive one or more turbines that convert the thermal potential energy of steam into electrical energy. After condensing, coolant is returned to locations near the base of heat exchangers 50 and 60.

Figure 2A:
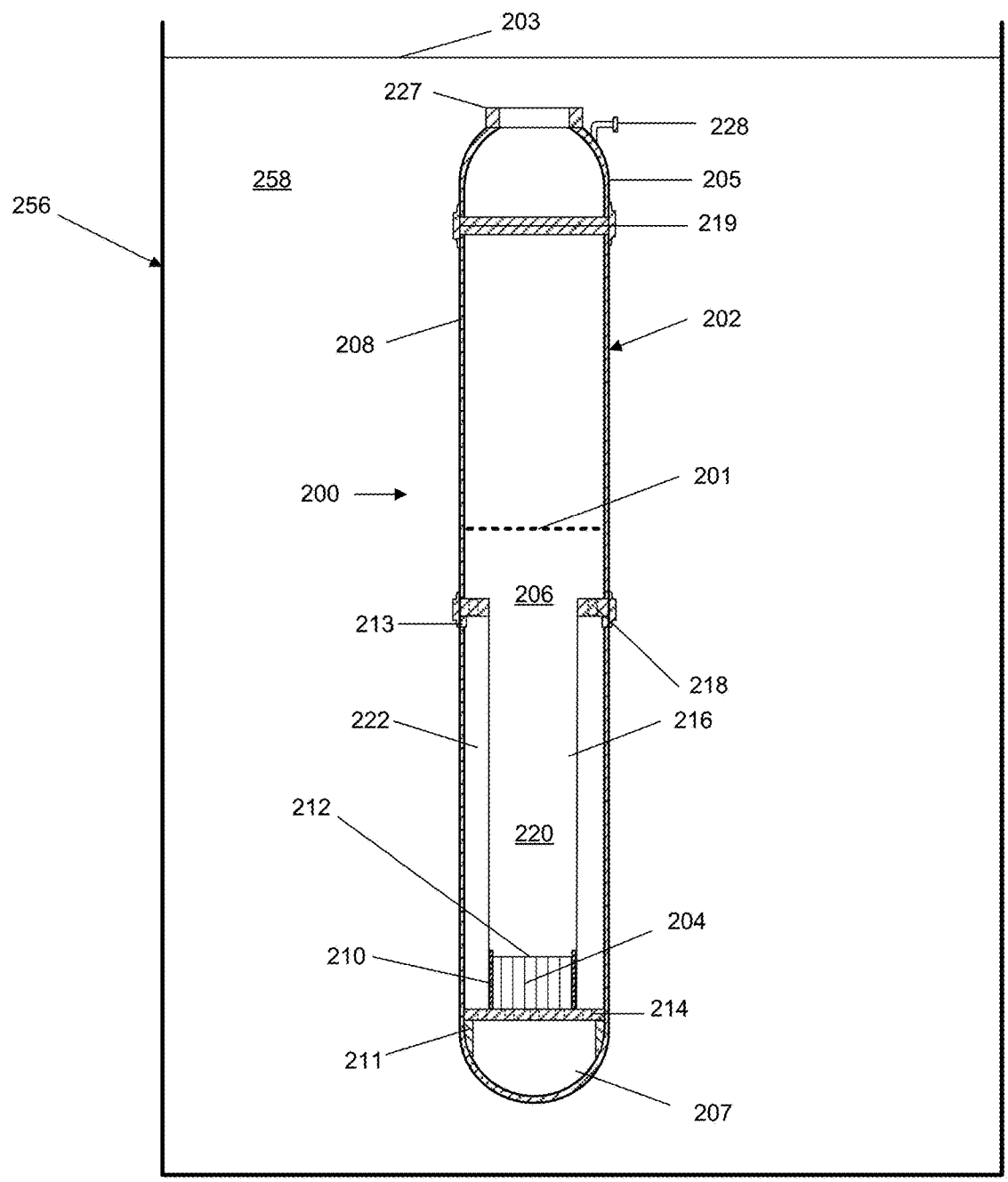
Figure 2C:
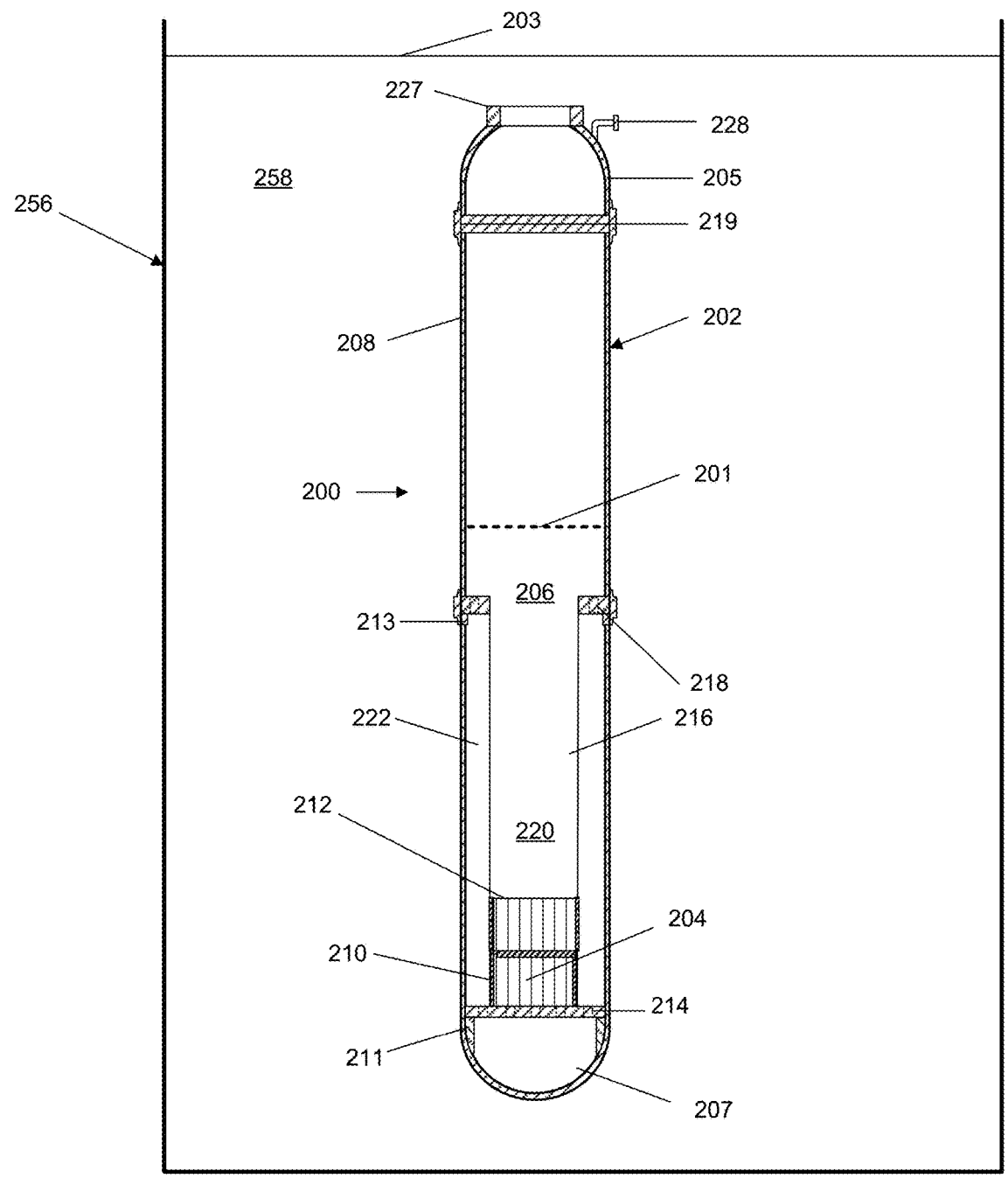

FIGS. 2A-2C illustrate schematic views of an example implementation of a spent fuel canister 200 operating in normal conditions having one stack or two stacks of spent fuel rods. Canister 200 includes a submersible vessel 202 that contains spent fuel rods 204 and coolant 206 surrounding the spent fuel rods 204. As shown schematically in FIG. 2A, canister 200 (filled to a coolant level 201) is supported in a spent fuel pool 256 filled with fluid 258 (e.g., water or some other suitable coolant). In some implementations, the fluid 258 in spent fuel pool 256 (filled to fluid level 203) is continuously or intermittently circulated by pumps or other hardware to improve heat transfer between vessel 202 and the fluid 258. Circulation of the fluid 258, in some aspects may increase the effectiveness of convective heat transfer between the canister 200 and the fluid 258.

Vessel 202, in the example implementation, facilitates the dissipation of decay heat from multiple spent fuel rods 204. In this example, vessel 202 is an elongated capsule-shaped container, having a cylindrical main body with two elliptical or hemispherical heads on either end (e.g., the top head 205 and the bottom head 207). The shape of vessel 202, in this example provides a relatively large amount of available surface area (e.g., relative to the available volume) to facilitate convective heat transfer with both the coolant 206 contained within the vessel 202 and the fluid 258 surrounding the vessel 256 in the spent fuel pool 256. The shape of the vessel 202 also may facilitate gravity driven natural circulation of the contained coolant 206. In some examples, vessel 202 defines an outer diameter of between about 7 and 12 ft. and a length of about 72 D. In some examples, vessel 202 defines a surface area of about 1600 ft.$^2$ Vessel 202 can be sized to lengths and diameters that can be accommodated in typical commercial nuclear spent fuel pools (e.g., 30 to 50 ft. in length).

Vessel 202, in this example, is hermetically sealed and capable of pressurization to a specified design limit (e.g., 400-500 psia). As discussed below, the design limit pressure of vessel 202 may be particularly significant to vessel heat removal in abnormal operating conditions. The cylindrical shell or casing 208 of vessel 202, in this example, is a thin-walled construction fashioned from a corrosion resistant and heat conductive material (e.g., steel). In general, cylindrical shell 208 conducts heat and withstands pressure, thermal, radiation, and seismic induced stresses. The cylindrical shell 208 can be fabricated using materials approved for use in nuclear reactor pressure vessels. For example, in some implementations, cylindrical shell 208 includes a steel base material such as SA302 GR B, SA533 GR B, Class 1, SA 508 Class 2, or SA 508 Class 3 that may be clad with TYPE 308L, 309L TYPE 304 austenitic stainless steel. Other base materials can be implemented such as 16l MnD5, 20MnMoNi55, 22NiMoCr3 7, 15Kh2MFA(A), 15Kh2NMFA(A) with Sv 07Kh25N13 and/or Sv 08Kh19N10G2B austenitic cladding. In some examples, cylindrical shell 208 does not provide any shielding to block or otherwise inhibit potentially harmful radiation generated by spent fuel rods 204. However, in some other examples, cylindrical shell 208 is provided with radiation shielding. Cylindrical shell 208 can be fabricated using rolled plate or ring forgings. The wall thickness of cylindrical shell 208 can be between about 1.5 and 4.5 inches. In any event, the material and thickness of cylindrical shell 208 provides sufficient strength to withstand stresses associated with the design limit pressurization.

Spent fuel rods 204 are secured in place near the bottom of vessel 202 inside the riser channel 216 and supported by a lower support plate 214 (e.g., as also shown in FIG. 29) and lower support structure 211. As shown, the lower support plate 214 and riser channel 216 form a "basket" which cradles spent fuel rods 204 and facilitates natural circulation of coolant 206. In this example, fuel barrel support/shield 210 includes a fuel barrel and radiation shield that supports a plurality of individual racks 212. It is attached to lower support plate 214 and channel riser 216. Channel riser 216 is supported by upper support ring 218 and upper support structure 213. Racks 212 receive respective spent fuel rods 204 and maintain them in a relatively stable, e.g., non-critical, condition. For example, racks 212 can be fashioned from a material that includes a neutron absorber (e.g., boron) to inhibit criticality events. FIG. 2A shows a single stack of spent fuel 204 whereas FIG. 2C shows a double stack of spent fuel 204.

FIG. 3A shows a first example fuel barrel support/shield structure 310a with a particular number (e.g., 37) of available racks 312a to accommodate respective spent fuel rods. FIG. 3B shows a second example fuel barrel support/shield structure 310b with another number (e.g., 97) of fuel accommodating racks 312b. Support structure 310b is significantly larger than support structure 310a, and therefore may require a larger vessel. For example, support structure 310a can be incorporated in a vessel having a 7 ft. outer diameter, while support structure 310b can be incorporated in a vessel having a 12 ft. outer diameter. The racks can be arranged to accommodate a wide variety of fuel types such as those typical of boiling water reactors (e.g., 8×8, 9×9, or 10×10 fuel assemblies) or the larger pressurized water reactor fuel assemblies (e.g., 17×17 fuel bundles).

In these illustrations, racks 312a and 312b are rectilinear in cross-section defining an open area of about 11 and 28 ft$^2$ respectively. Of course, other suitable shapes (e.g., circular, hexagonal, triangular, etc.) sizes can also be implemented. Further, as shown, racks 312a and 312b are arranged in a symmetrical, tightly packed honeycomb configuration. In some examples, this geometric configuration is provided for the dual purposes of heat removal and criticality mitigation. However, other suitable configurations can also be effectively implemented. For instance, racks 312a and 312b can be spaced apart from one another (as opposed to tightly packed), or arranged in some other symmetrical configuration quadrilateral configuration), as opposed to a honeycomb shape.

Turning back to FIG. 2A, upper support ring 218 and lower support plate 214 forms the base of support for the riser channel 216. In addition, lower support plate 214 may have sufficient strength to bear the weight of spent fuel rods 204. Lower support plate 214 allows coolant 206 to flow upward past spent fuel rods 204 for convective heat transfer from the spent fuel rods 204 to the coolant. For example, lower support plate 214 can include small perforations or large openings that allow naturally circulating coolant 206 to flow up through the support plate and past spent fuel rods 204.

The illustrated riser 216 extends upward from lower support plate 214 to surround the fuel barrel support/shield 210 and the spent fuel rods 204 supported in racks 212. As shown, riser 216 extends from a point near the top of the lower support plate 214 to the top of the upper support ring 218, a point that is approximately halfway to the vessel's upper head flange 219. For example, riser 216 can have a height of about 30 ft. In some examples, riser 216 is cylindrical in shape with a rounded shaped exit, so as to reduce form losses in the naturally circulating coolant 206.

The example riser 216 defines a hollow bore 220 that serves to direct coolant 206 upward through the interior of vessel 202, and a narrow annulus 222 that directs coolant downward along the inner wall of vessel 202. Upper support ring 218 peels radially inward from the cylindrical shell 208 to the top of riser 216. Similar to support plate 214, upper support ring 218 also includes perforations or large openings that allow naturally circulating coolant 206 to pass downward through the upper support ring 218 and through annulus 222.

Vessel 202 may initially be filled with an amount of liquid coolant 206. In particular, the vessel 202 is filled with at least enough coolant 206 to place the liquid level 201 above the top of the upper support ring 218. In some examples, vessel 202 is filled with about 35 m³ of liquid coolant 206. The coolant can include water and/or some additional type of coolant. For instance, coolant 206 under natural circulation conditions may generate a convective heat transfer coefficient of between about 1000-2500 (W/m²K on the inside surface of cylindrical shell 208. Coolant 206 can be engineered to undergo a liquid-to-gas phase change under certain conditions (e.g., when convective heat transfer to the ambient fluid 258 in the spent fuel pool 256 has significantly decreased) to maintain the heat removal rate at a substantially constant level in abnormal operating conditions, as explained in detail below.

In operating under normal conditions as shown in FIG. 2A (e.g., no loss of power or loss of fluid 258) vessel 202 is submerged in the spent fuel pool fluid 258. Natural circulation of the coolant 206 inside of vessel 202 is established by the buoyancy force generated as a result of the density and elevation differences between hot coolant 206 in contact with the spent fuel 204 and cooler coolant 206 in annulus 222. That is, when coolant 206, in contact with the spent fuel 204, is heated by the decay heat emanating from spent fuel rods 204, the coolant 206 becomes less dense and begins to rise. The rising coolant 206 is directed upward through racks 212 holding spent fuel rods 204. As the coolant 206 flows up past the spent fuel rods 204, it receives even more heat, which makes it continue to flow upward. Riser 216 directs the heated coolant 206 upward through bore 220, away from spent fuel rods 204 and toward the exit of the channel riser 216 near the top of the upper support ring 218. Coolant 206 emerging from riser 216 is cooled down through convective heat transfer with the inner surface of vessel 202. The heat is conducted through the wall of vessel 202 then transferred by convection to the spent fuel pool fluid 258. The cooled coolant 206 becomes denser and is therefore drawn downward by gravity. The sinking coolant 206 is directed trough the perforated upper support ring 218 of support structure 210 and through annulus 222, through the perforated lower support plate 214 and ultimately returning to the lower head 207 of vessel 202.

Figure 4:
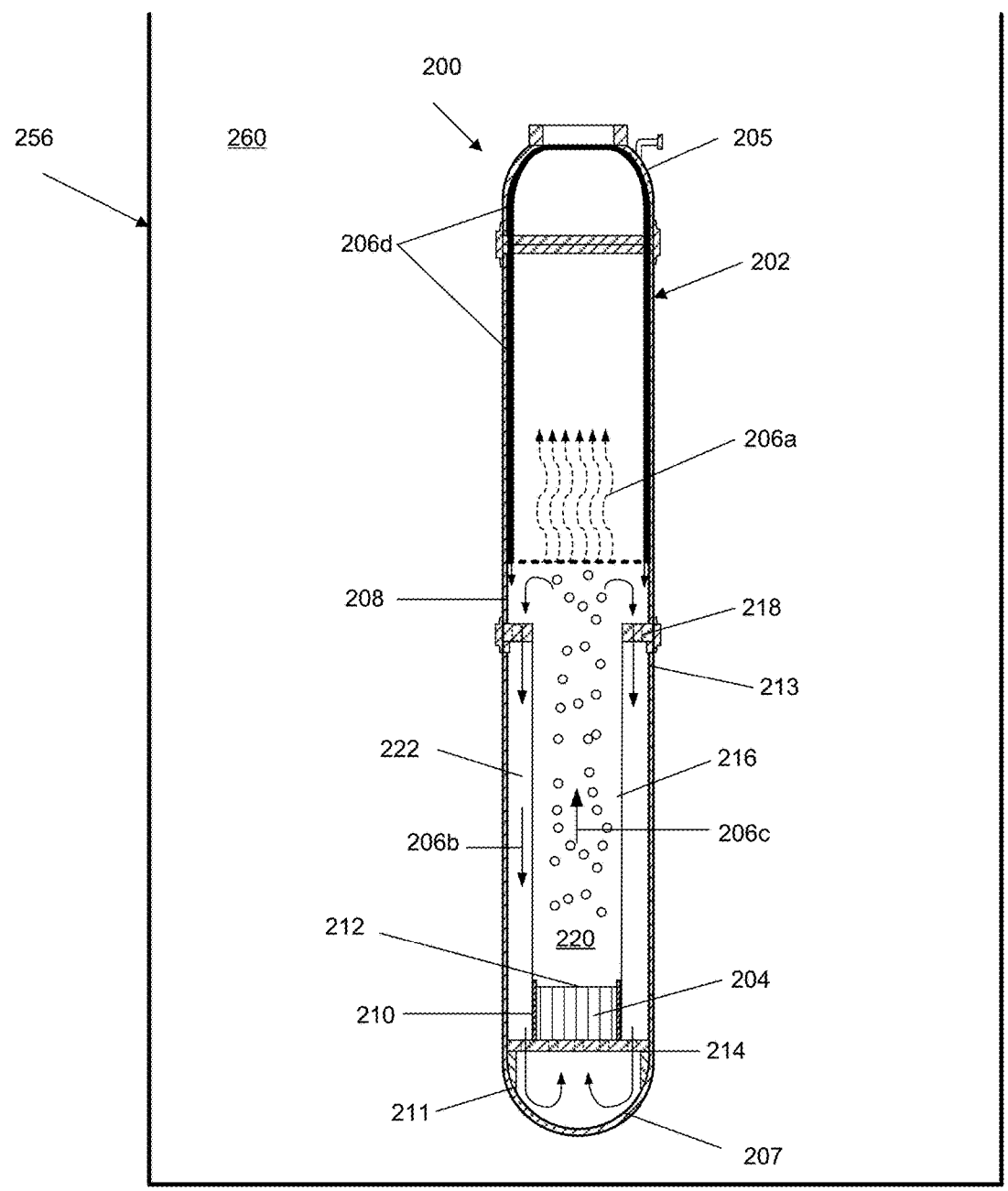
FIG. 4 illustrates a schematic view of an example implementation of a spent fuel canister operating in abnormal conditions.

FIG. 4 illustrates a schematic view of an example implementation of spent fuel canister 200 operating in abnormal conditions. In some implementations, spent fuel canister 200 is designed to operate in abnormal operating conditions, while maintaining a substantially constant rate of decay heat removal. In some aspects, the abnormal operating condition is an emergency situation where spent fuel pool 256 has been drained or the fluid 258 has evaporated (as shown in FIG. 4). However, other types of abnormal operating conditions may also occur (e.g., loss of fluid circulation in the spent fuel pool 256). In such abnormal operating conditions, an amount of convective heat transfer between vessel 202 and the surrounding ambient environment may be significantly reduced. The reduced rate of heat transfer ultimately causes liquid coolant 206 in contact with the spent fuel 204 to undergo a liquid-to-gas phase change. A low density, two-phase coolant mixture 206c rises up through the spent fuel 204 and exits the top of the riser channel 216. At the top of the riser 216, the gas phase coolant 206a and the liquid phase coolant 206b separate from the two-phase coolant 206c by gravity. The liquid phase coolant 206b travels downward through the perforated upper support ring 218 into the annulus 222. The gas phase coolant 206a continues to travel upward in the vessel 202 to the upper head 205. When the gas phase coolant 206a comes in contact with the inside wall of the vessel 202, it exchanges heat with the wall to produce a condensate 206d. The condensate 206d may be in the form of a liquid film or droplets that travel downward along the inside wall of the vessel 202. The condensate 206d collects in the region above the upper support ring 218 and mixes with the downward flowing liquid coolant 206b. The condensate 206d and the liquid phase coolant 206b travel downward through the annulus, through the perforated lower support plate 214 and lower head 207 plenum and back upward through the spent fuel racks 212.

In this example, the canister can transition from liquid cooling (e.g., water) to air cooling in the spent fuel pool 256 without the need for operator actions or external power. As noted above, the heat removal rate of the air cooled canister 200 may be substantially equal to that of the liquid cooled canister 200. In particular, the liquid-to-gas phase change may cause the inner cavity of vessel 202 to pressurize. Pressurization of vessel 202 increases the saturation temperature within the vessel 202, and thus raises the temperature of its outer surface. The increased outer surface temperature of vessel 202 increases both the thermal radiation heat transfer rate to the surroundings and the free convection heat transfer rate with the ambient air 260 (as opposed to liquid 258 in the spent fuel pool during normal operating conditions) to a point where the overall heat removal rate of canister 200 is acceptable. For example, the large surface area and high surface temperature of vessel 202 may be sufficient to remove heat from the canister 200 to the ambient air 260 at substantially the same rate as with the fuel pool fluid 258.

Figure 5A:
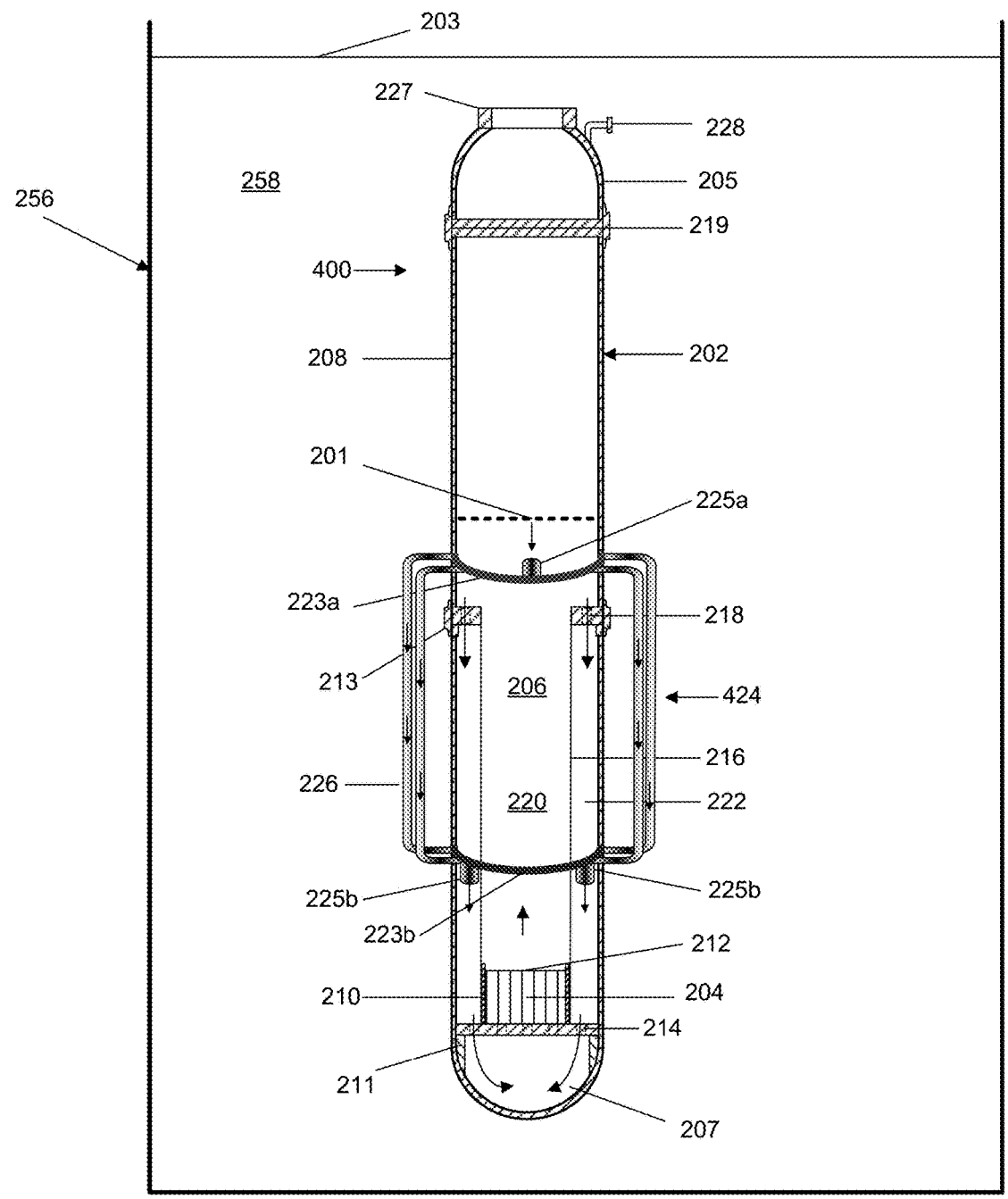
FIGS. 5A-5B illustrate schematic views of an example implementation of a spent fuel canister that includes an external heat exchanger and is operating in normal conditions.
Figure 5B:
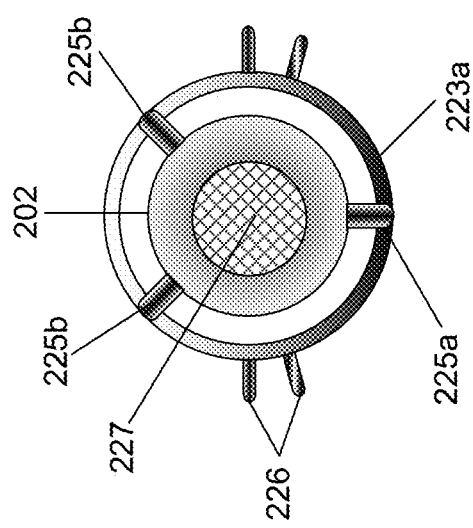

FIGS. 5A-5B illustrate schematic views of an example implementation of a spent fuel canister 400 that includes an external heat exchanger 424 and is operating in normal conditions. As shown, heat exchanger 424 includes a horizontal upper tube header 223a and a horizontal lower tube header 223b joined together by a series of c-shaped vertical heat exchanger tubes 226. The heat exchanger tubes can be 2 to 4 inches in diameter and 15-20 feet in length. The upper tube header 223a, in this example, is connected to cylindrical shell 208 below the coolant level 201 and above the upper support ring 218 by header conduit 225a. The lower tube header 223b is connected to annulus 222 by header conduits 225b. In some examples, header conduits 225a and 225b are sloped such that liquid flowing through the conduits is always in the downward direction. The heat exchanger 424 is designed to withstand hill pressure and temperatures during normal and abnormal conditions.

As shown in FIG. 5A, during normal conditions, hot liquid coolant 206 rises through the bore 220 to the outlet of the riser 216. Approximately half of the liquid coolant 206 enters the upper header conduits 225a into heat exchanger 424 where it transfers heat to the spent fuel pool fluid 258. The remaining half of the liquid coolant travels through the perforated upper support ring 218 into the annulus 222 where it transfers heat to the spent fuel pool fluid 258 by convection and conduction heat transfer through the vessel 202 walls. The flow paths for the coolant 206, in this example, are established by natural circulation created by the buoyancy force established by the density difference of the coolant in the bore 220 and the annulus 222 and the relative elevation of their thermal centers.

Figure 5C:
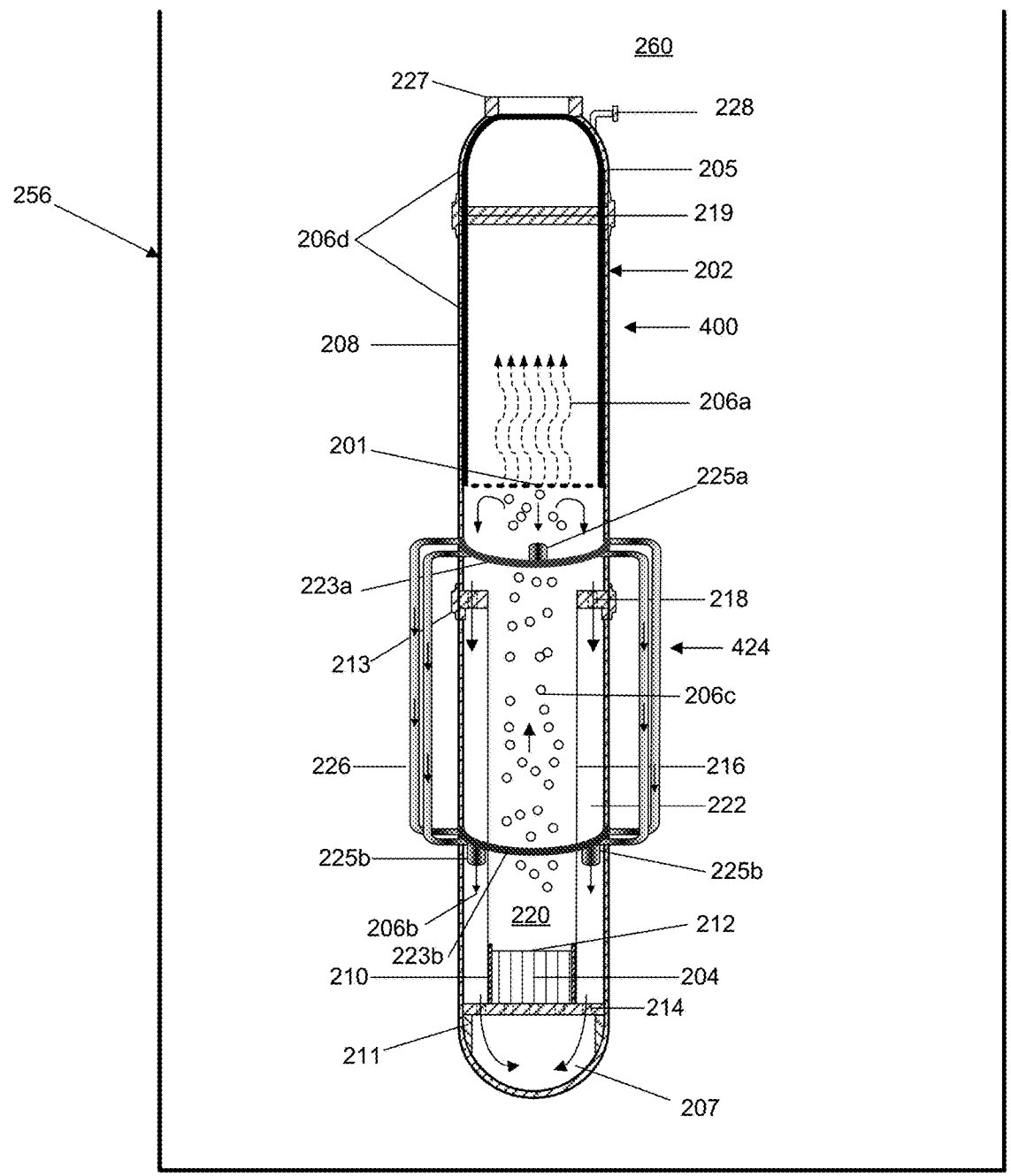
FIG. 5C illustrates a schematic view of an example implementation of a spent fuel canister t a includes an external heat exchanger and is operating in abnormal conditions.

FIG. 5C illustrates a schematic view of an example implementation of a spent fuel canister 400 that includes an external heat exchanger 424 and is operating in abnormal conditions. In this example, although similar to that illustrated in FIG. 4, the addition of heat exchanger 424 provides additional surface area for natural circulation cooling. Convection heat transfer inside the tubes can increase the heat removal rate capacity of the canister thereby reducing the overall height of the canister. In the present example, a sixty-five tube heat exchanger of 16 ft. tube length can reduce the canister height by at about 30% (e.g., from 72 feet to 50 feet) while rejecting the same amount of heat, 0.35 MW to the ambient air 206. In some examples, heat exchanger 424 is a sixty-five tube heat exchanger or an approximately 150 tube heat exchanger. The number and lengths of heat exchanger tubes 226 can be selected to provide a wide range of desired heat removal rates.

Figure 6A:
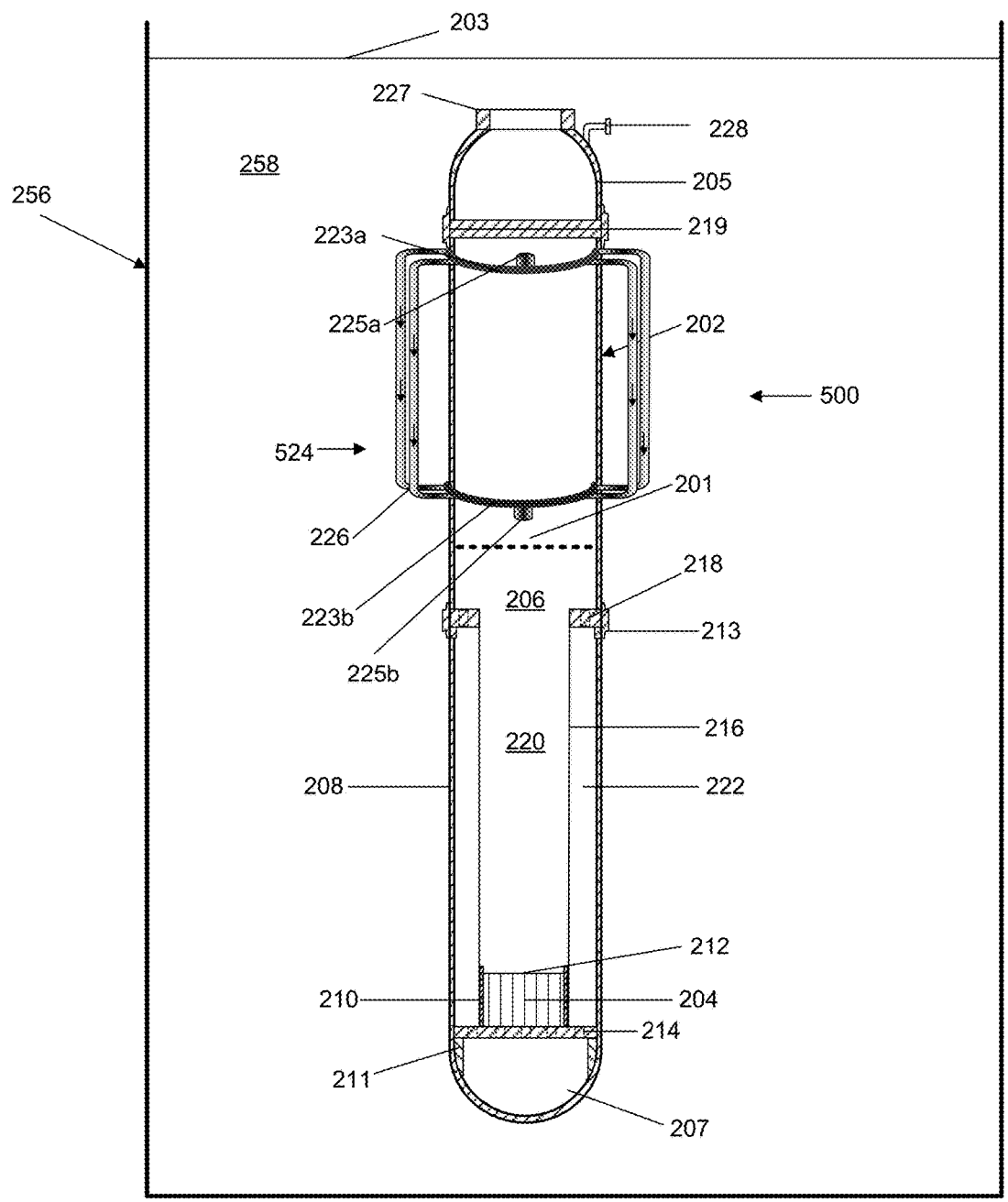
FIGS. 6A-6B illustrate schematic views of another example implementation of a spent fuel canister that includes an external heat exchanger and is operating in normal conditions.
Figure 6B:
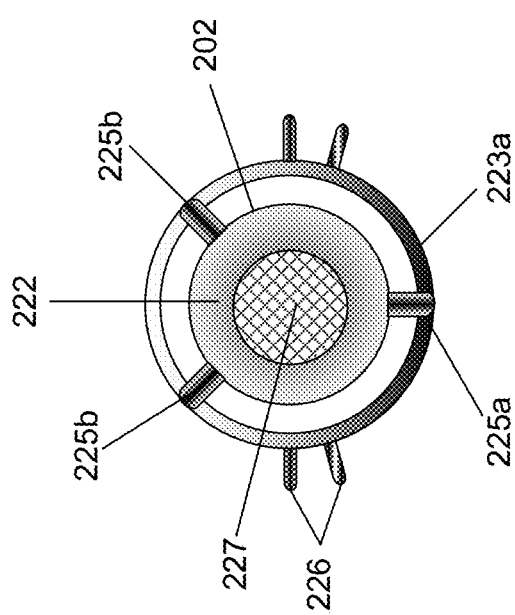

FIGS. 6A-6B illustrate schematic views of another example implementation of a spent fuel canister 500 that includes an external heat exchanger 525 and is operating in normal conditions. As shown, heat exchanger 524 includes a horizontal upper tube header 223a, a horizontal lower tube header 223b joined together by a series of c-shaped vertical heat exchanger tubes 226. The heat exchanger tubes can be 2 to 4 inches in diameter and 15-20 feet in length. In the illustrated example, the heat exchanger 525 is connected to cylindrical shell 208 between the level 201 and the upper support ring 218 by header conduit 225a. The lower tube header 223b is connected to annulus 222 by header conduits 225b. Header conduits 225a and 225b are sloped such that liquid flowing through the conduits is always in the downward direction. The heat exchanger 524, in some aspects, is designed to withstand full pressure and temperatures during normal and abnormal conditions. During normal conditions, the heat transfer mechanism may be identical or substantially similar to the same as those described for FIG. 2A.

Figure 6C:
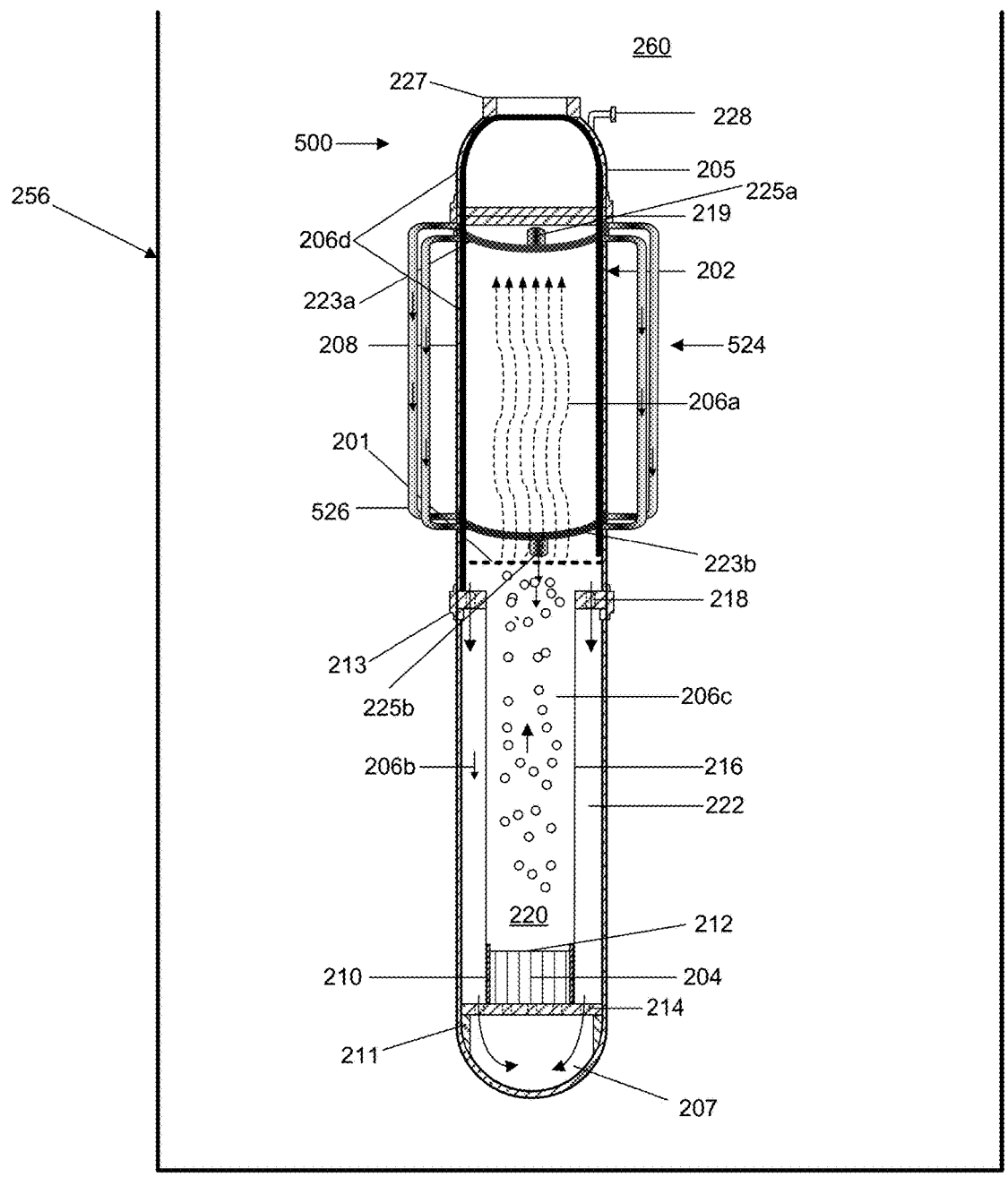
FIG. 6C illustrates a schematic view of another example implementation of a spent fuel canister that includes an external heat exchanger and is operating in abnormal conditions.

FIG. 6C shows canister 500 operating under abnormal conditions, rejecting heat to ambient air 206. The liquid phase coolant behaves as described previously for FIG. 4. However, because heat exchanger 524 is connected to the gas phase region of the canister, (e.g., through riser 216) a portion of the gas phase coolant 206a is condensed inside the heat exchanger tubes. This creates a low pressure region inside the tubes 526 which draws additional gas phase coolant 206a into the tubes. The condensate 206d inside the tubes 526 falls by gravity through the tubes 526 into the cylindrical shell. The condensate mixes with the two-phase coolant 206c in the region above the upper support ring 218. The liquid phase coolant 206b travels downward by gravity through the perforated upper support ring 218 into the annulus 222, through the perforated lower support plate 214, through the plenum formed by the lower head 207. It flows upward through the spent fuel racks 212 thereby cooling the spent fuel 204.

Figure 7:
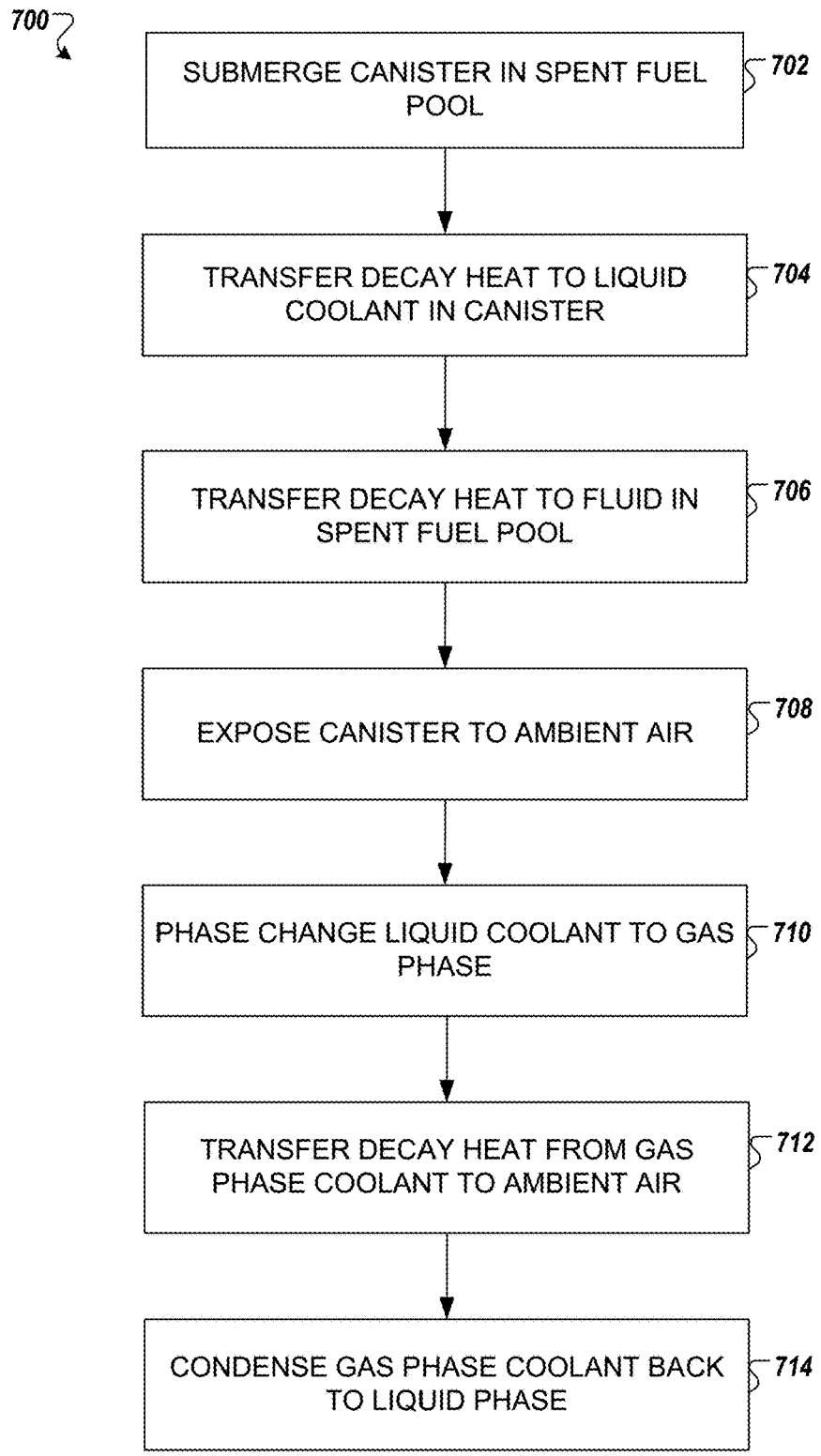
FIG. 7 is a flow chart illustrating an example method of dissipating decay heat generated by a spent fuel rod.

Another implementation of the present disclosure features various methods of dissipating decay heat generated by a spent fuel rod. FIG. 7 illustrates an example method 700 for dissipating decay heat. The method includes, at step 702, submerging a spent fuel canister in a heat transfer fluid contained in a spent fuel pool. As described above, the spent fuel canister can include a cylindrical shell defining an interior cavity which contains the spent fuel rod. At step 704, decay heat is transferred from the spent fuel rod to liquid coolant contained within the canister. In some implementations, the coolant is circulated within the canister via natural circulation to facilitate heat transfer. At step 706, the decay heat is transferred from the coolant, through a wall of the canister, to the heat transfer fluid of the spent fuel pool. A rate at which heat is transferred from the spent fuel rod is at least as great as orate at which the spent fuel rod produces decay heat.

Method 700 can also optionally include, at step 708, exposing the canister to ambient air due to a loss of spent fuel pool fluid. At step 710, based on the exposure to ambient air, a portion of the coolant inside the canister is phase changed from a liquid to a gas. At step 712, heat is transferred, through a wall of the canister, from the gas phase coolant to the ambient air. At step 714, the gas phase coolant is condensed back to a liquid and circulated (e.g., via natural circulation) within the canister.

Figure 8:
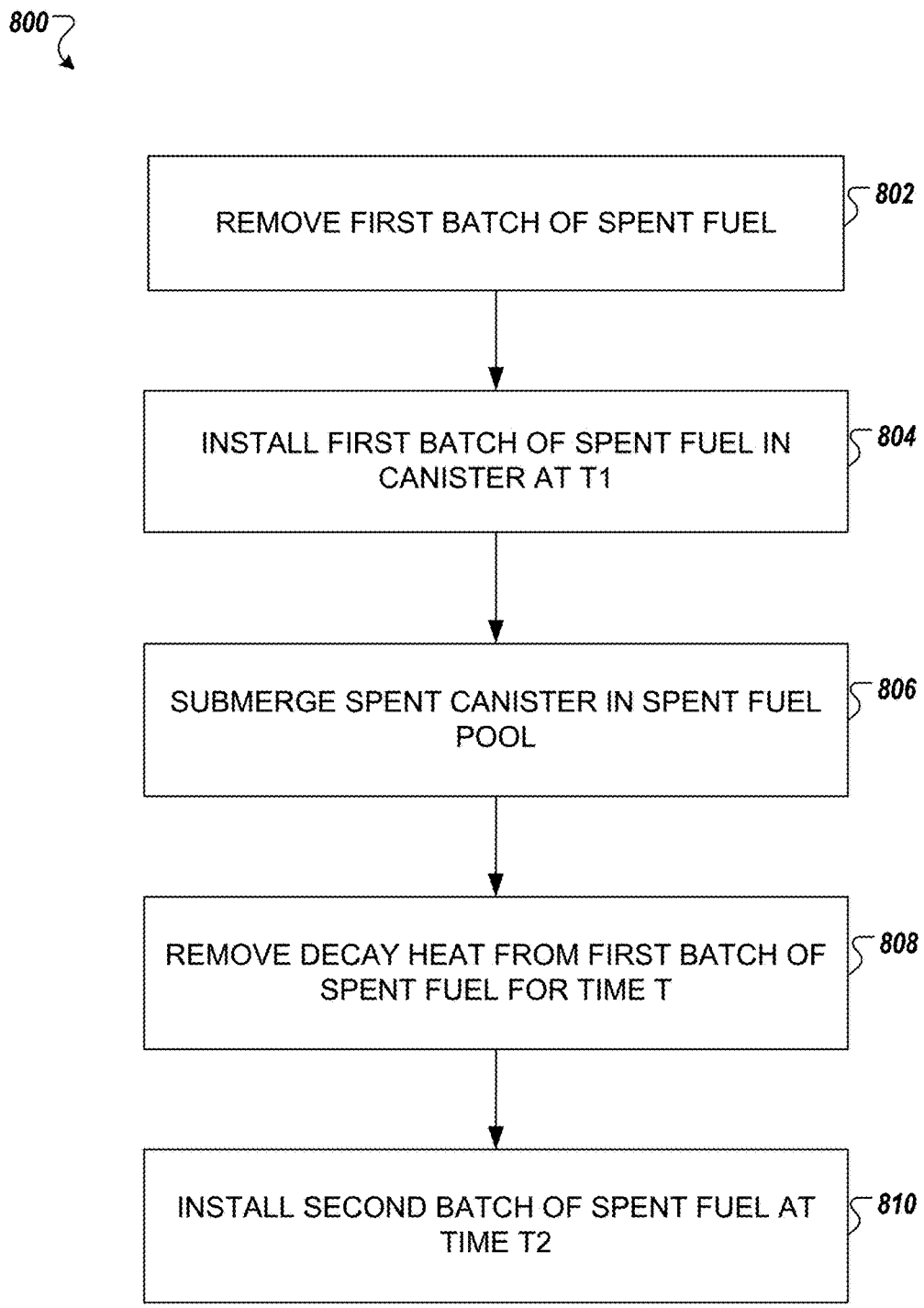
FIG. 8 is a flow chart illustrating an example method of managing spent fuel rods from a nuclear reactor system.

Yet another implementation of the present disclosure features various methods of managing spent fuel rods by cycling them through spent fuel canisters. FIG. 8 illustrates an example method 800 for managing spent fuel rods. The method includes, at step 802, removing a first batch of spent fuel rods from a nuclear reactor. At step 804, the first batch of spent fuel rods is installed in a spent fuel canister (e.g., spent fuel canister 100) at a first time (T1). At step 806, the spent fuel canister is submerged in a heat transfer fluid (such as contained in spent fuel pool 156). At step 808, the canister is used to remove decay heat from the first batch of spent fuel rods for a time period (T). At step 810, a second batch of spent fuel rods is installed within the spent fuel canister at a second time (T2). The heat removal rate of the spent fuel canister is at least as great as the combined decay heat rate of the first and second batches of spent fuel rods at T2. As discussed in context of the first and second examples below, the example method of FIG. 8 can be used to continuously manage spent fuel from a nuclear reactor.

In some aspects, an example spent fuel management system (e.g., spent fuel management system 154) that includes a spent fuel pool and multiple spent fuel canisters according to the present disclosure (e.g., spent fuel canister 100, 200, 400, and/or 500) manages spent fuel from nuclear reactors (e.g., 1-12 nuclear reactors 152) each effectively refueled once every twenty-four months, with a spent fuel batch of one-half core, approximately 18 fuel assemblies being removed every two months. Each batch of spent fuel produces approximately 0.2 MW of decay power after twenty days, and 0.1 MW of decay power after six months. Spent fuel that has decayed for six months can be discharged from the spent fuel canisters into, for example, a typical liquid coolant filled, non-pressurized, spent fuel pool. After an additional period of cooling, for example 5-10 years, the spent fuel can be discharged to a dry cask. In this example, there is sufficient liquid coolant 158 in the spent fuel pool 156 to provide 20 days of cooling before transitioning to cooling by ambient air. The system includes two spent fuel canisters, each capable of achieving at least 0.5 MW of decay heat removal when fully immersed in spent fuel pool coolant 158 and 0.35 MW decay heat removal after the 20 day transition cooling period. Table 1 below illustrates an example linear sequence for canister loading and unloading to accommodate spent fuel from the nuclear reactor. In Table 1, "T" is in months and "B#" represents a particular batch of spent fuel. A "+" indicates that the batch is loaded into the canister and a "−" indicates that the batch is removed.

TABLE 1

| Canister # | T = 0 | T = 2 | T = 4 | T = 6 | T = 8 | T = 10 |
|---|---|---|---|---|---|---|
| Canister 1 | +B1<br>0.35 MW | | +B3<br>0.5 MW | | −B1<br>+B5<br>0.5 MW | |
| Canister 2 | | +B2<br>0.35 MW | | +B4<br>0.5 MW | | −B2<br>+B6<br>0.5 MW |

| Canister # | T = 12 | T = 14 | T = 16 | T = 18 | T = 20 | T = 22 | T = 24 |
|---|---|---|---|---|---|---|---|
| Canister 1 | −B3<br>+B7<br>0.5 MW | | −B5<br>+B9<br>0.5 MW | | −B7<br>+B11<br>0.5 MW | | −B9<br>+B13<br>0.5 MW |
| Canister 2 | | −B4<br>+B8<br>0.5 MW | | −B6<br>+B10<br>0.5 MW | | −B8<br>+B12<br>0.5 MW | |

In the example sequence presented in Table 1, all of the spent fuel batches would have decayed for eight months prior to discharge. This approach, in some aspects, eliminates the potential risks associated with having higher power density spent fuel placed directly next to lower power density spent fuel. The higher power density spent fuel presents the greater risk of zirconium cladding ignition in air in the event of a loss of spent fuel pool water 158 which could potentially ignite the lower power density spent fuel.

In another example spent fuel management system, the system may manage spent fuel from nuclear reactors (e.g. 1-12 nuclear reactors 152) each effectively refueled once every twenty-four months, with a spent fuel batch of one-half core being removed every two months. Each batch of spent fuel provides 0.2 NM of decay power after twenty days, and 0.1 MW of decay power after six months. Spent fuel that has decayed for six months can be discharged from the spent fuel canisters into, for example, a typical liquid coolant filled, non-pressurized, spent fuel pool. After an additional period of cooling, for example 5-10 years, the spent fuel can be discharged to a dry cask. The system includes a single spent fuel canister capable of achieving at least 0.65 MW decay heat removal when fully immersed in spent fuel pool coolant 158 and 0.45 MW decay heat removal after the 20 day transition cooling period. Table 2 below illustrates a linear sequence for canister loading and unloading to accommodate spent fuel from the nuclear reactor using the larger spent fuel canister.

TABLE 2

| Canister # | T = 0 | T = 2 | T = 4 | T = 6 | T = 8 | T = 10 |
|---|---|---|---|---|---|---|
| Canister 1 | +B1<br>0.35 MW | +B2<br>0.5 MW | +B3<br>0.65 MW | −B1<br>+B4<br>0.65 MW | −B2<br>+B5<br>0.65 MW | −B3<br>+B6<br>0.65 MW |

| Canister # | T = 12 | T = 14 | T = 16 | T = 18 | T = 20 | T = 22 | T = 24 |
|---|---|---|---|---|---|---|---|
| Canister 1 | −B4<br>+B7<br>0.65 MW | −B5<br>+B8<br>0.65 MW | −B6<br>+B9<br>0.65 MW | −B7<br>+B10<br>0.65 MW | −B8<br>+B11<br>0.65 MW | −B9<br>+B12<br>0.65 MW | −B10<br>+B13<br>0.65 MW |

Note that this larger spent fuel canister, in some aspects, provides sufficient space to accommodate a six month discharge of the spent fuel batches.

In another example spent fuel management system, the system may manage spent fuel from a single nuclear reactor effectively refueled once every forty-eight months, with a spent fuel hatch of one-full core (e.g. 37 assemblies) being removed and replaced. Each batch of spent fuel produces 0.4 MW of decay power after twenty days and 0.2 MW of decay power after six months. Spent fuel that has decayed for six months can be discharged from the spent fuel canisters into, for example, a typical liquid coolant filled, non-pressurized, spent fuel pool. After an additional period of cooling, for example 5-10 years, the spent fuel can be discharged to a dry cask. The system includes a single spent fuel canister capable of achieving at least 0.85 MW decay heat removal when fully immersed in spent fuel pool coolant 158 and 0.6 MW decay heat removal after the 20 day transition cooling period. Table 3 below illustrates a linear sequence for canister loading and unloading to accommodate spent fuel from the nuclear reactor using the larger spent fuel canister.

TABLE 3

| Canister # | T = 0 | T = 4 yrs | T = 8 yrs | T = 12 yrs | T = 16 yrs | T = 18 yrs | T = 24 yrs |
|---|---|---|---|---|---|---|---|
| Canister 1 | +B1 0.7 MW | +B2 0.85 MW | −B1 +B3 0.85 MW | −B2 +B4 0.85 MW | −B3 +B5 0.85 MW | −B4 +B6 0.85 MW | −B5 +B7 0.85 MW |

The use of terminology such as "front," "back," "top," "bottom," "over," "above," and "below" throughout the specification and claims is for describing the relative positions of various components of the system and other elements described herein. Similarly, the use of any horizontal or vertical terms to describe elements is for describing relative orientations of the various components of the system and other elements described herein. Unless otherwise stated explicitly, the use of such terminology does not imply a particular position or orientation of the system or any other components relative to the direction of the Earth gravitational force, or the Earth ground surface, or other particular position or orientation that the system other elements may be placed in during operation, manufacturing, and transportation.

A number of implementations have been described. Nevertheless, it will be understood that various modifications may be made. For example, advantageous results may be achieved if the steps of the disclosed techniques were performed in a different sequence, if components in the disclosed systems were combined in a different manner, or if the components were replaced or supplemented by other components. Accordingly, other implementations are within the scope of the following claims.

What is claimed is:

1. A spent nuclear fuel rod canister, comprising:
    a submersible pressure vessel comprising a casing that defines an interior cavity, the casing comprising a corrosion resistant and heat conductive material;
    a rack enclosed within the interior cavity and configured to support one or more spent nuclear fuel rods;
    a riser that defines a fluid pathway between a top portion of the interior cavity and a bottom portion of the interior cavity;
    an annulus defined between the riser and the casing; and
    a heat exchanger attached to the casing of the pressure vessel,
    the heat exchanger comprising at least one conduit that is at least partially disposed exterior to the casing,
    the at least one conduit comprising an interior volume flowpath that is in fluid communication with the interior cavity of the pressure vessel,
    the at least one conduit comprising
        a first conduit comprising an end of the interior volume flowpath that includes an opening located in the riser and
        a second conduit comprising an end of the interior volume flowpath that includes an opening located in the annulus.

2. The spent nuclear fuel rod canister of claim 1, further comprising:
    a first hemispherical enclosure coupled to the casing at a top end of the casing, the first hemispherical enclosure comprising a radiussed interior surface that defines a top portion of the interior cavity; and
    a second hemispherical enclosure coupled to the casing at a bottom end of the casing, the second hemispherical enclosure comprising a radiussed interior surface that defines a bottom portion of the interior cavity.

3. The spent nuclear fuel rod canister of claim 1, further comprising a fuel basket positioned in the interior cavity within the riser and near the bottom portion of the interior cavity.

4. The spent nuclear fuel rod canister of claim 3, wherein the fuel basket comprises:
    a perforated support plate adjacent a bottom surface of the rack, the fluid pathway fluidly coupled to the bottom portion of the interior cavity through the perforated support plate.

5. The spent nuclear fuel rod canister of claim 1, wherein the at least one conduit further comprises a third conduit comprising another end of the interior volume flowpath that includes an opening located in the annulus.

6. The spent nuclear fuel rod canister of claim 1, wherein the casing is configured to permit radiation from the one or more spent nuclear fuel rods therethrough.

7. The spent nuclear fuel rod canister of claim 2, wherein the end of the first conduit is positioned below a liquid level of a coolant that at least partially fills the interior cavity of the casing.

8. The spent nuclear fuel rod canister of claim 7, further comprising a fuel basket positioned in the interior cavity within the riser and near the bottom portion of the interior cavity.

9. The spent nuclear fuel rod canister of claim 8, wherein the fuel basket comprises:
    a perforated support plate adjacent a bottom surface of the rack, the fluid pathway fluidly coupled to the bottom portion of the interior cavity through the perforated support plate.

10. The spent nuclear fuel rod canister of claim 9, wherein the at least one conduit further comprises a third conduit comprising another end of the interior volume flowpath that includes an opening located in the annulus.

11. A method of dissipating decay heat generated by a spent nuclear fuel rod, the method comprising:

loading at least one spent nuclear fuel rod into a rack positioned within an interior cavity of a spent nuclear fuel rod canister, the canister comprising:
- a submersible pressure vessel comprising a casing that defines an interior cavity that is at least partially filled with a fluid coolant,
  - the casing comprising a corrosion resistant and heat conductive material,
- a rack enclosed within the interior cavity and configured to support one or more spent nuclear fuel rods, and
- a heat exchanger attached to the casing of the pressure vessel,
  - the heat exchanger comprising at least one conduit that is at least partially disposed exterior to the casing,
    - the at least one conduit comprising an interior volume flowpath that is in fluid communication with the interior cavity of the pressure vessel,
    - the at least one conduit comprising
      - a first conduit comprising an end of the interior volume flowpath that includes an opening located in a riser that defines a fluid pathway between a top portion of the interior cavity and a bottom portion of the interior cavity and
      - a second conduit comprising an end of the interior volume flowpath that includes an opening located in an annulus defined between the riser and the casing;

submerging the spent nuclear fuel rod canister in a heat transfer fluid contained in a spent fuel pool;

transferring decay heat from the spent nuclear fuel rod to the fluid coolant;

circulating the heated fluid coolant through the riser and into the end of the first conduit;

transferring the decay heat from the heated fluid coolant, through the casing, and to the heat transfer fluid in the spent fuel pool; and circulating the fluid coolant from the end of the second conduit to and through the annulus.

12. The method of claim 11, wherein the fluid coolant is circulated through natural circulation.

13. The method of claim 11, further comprising exposing the casing of the spent fuel canister to ambient air.

14. The method of claim 13, further comprising:
- based on the exposure to ambient air, phase changing a portion of the fluid coolant from a liquid to a gas in the spent nuclear fuel rod canister; and
- phase changing the gas back to a liquid condensate on an interior surface of the casing based at least in part on heat transfer between the gas and the ambient air.

15. The method of claim 11, wherein transferring the decay heat from the heated fluid coolant, through the casing, and to the heat transfer fluid in the spent fuel pool comprises:
- convectively transferring the decay heat from the heated fluid coolant to the casing; and
- convectively transferring the decay heat from the casing to the heat transfer fluid.

16. The method of claim 11, wherein a rate at which heat is transferred from the spent fuel rod is at least as great as a rate at which the spent nuclear fuel rod produces decay heat.

17. The method of claim 11, wherein the casing is configured to permit radiation from the at least one spent nuclear fuel rod therethrough.

18. The method of claim 11, wherein the at least one conduit further comprises a third conduit comprising another end of the interior volume flowpath that includes an opening located in the annulus.

19. The method of claim 18, further comprising circulating the fluid coolant from the end of the third conduit to and through the annulus.

20. The method of claim 19, wherein the fluid coolant is simultaneously circulated from the ends of the second and third conduits to the annulus.

* * * * *